United States Patent
Stille et al.

(10) Patent No.: US 10,003,619 B2
(45) Date of Patent: Jun. 19, 2018

(54) SESSION INITIATION HANDLING

(71) Applicant: TELEFONAKTIEBOLAGET LM ERICSSON (PUBL), Stockholm (SE)

(72) Inventors: Mats Ola Stille, Bromma (SE); Jan Holm, Stora Skedvi (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 64 days.

(21) Appl. No.: 15/105,309

(22) PCT Filed: Dec. 20, 2013

(86) PCT No.: PCT/SE2013/051582
§ 371 (c)(1),
(2) Date: Jun. 16, 2016

(87) PCT Pub. No.: WO2015/094058
PCT Pub. Date: Jun. 25, 2015

(65) Prior Publication Data
US 2016/0315977 A1    Oct. 27, 2016

(51) Int. Cl.
*H04L 29/06* (2006.01)
*H04L 5/00* (2006.01)
*H04W 88/02* (2009.01)

(52) U.S. Cl.
CPC ........ *H04L 65/1069* (2013.01); *H04L 5/0055* (2013.01); *H04L 65/1006* (2013.01); *H04L 65/4015* (2013.01); *H04L 69/22* (2013.01); *H04L 29/06197* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2006/0077954 A1* | 4/2006 | Monk | ............... | H04L 29/06027 370/352 |
| 2010/0267374 A1* | 10/2010 | Armstrong | ........... | H04Q 3/0045 455/417 |
| 2012/0166652 A1* | 6/2012 | Bouthemy | .......... | H04L 65/1016 709/227 |
| 2012/0233327 A1* | 9/2012 | Smith | ................. | H04L 65/1073 709/225 |
| 2013/0229948 A1* | 9/2013 | Stewart | ............. | H04M 3/42246 370/259 |

FOREIGN PATENT DOCUMENTS

WO    2012053884 A1    4/2012

* cited by examiner

*Primary Examiner* — Hassan Phillips
*Assistant Examiner* — Ayanah George

(57) ABSTRACT

A method of handling SIP session initiation requests in an IP Multimedia Subsystem, IMS, network. The method is performed at an application server, AS, within the network. The AS receives a session initiation request containing a destination address, where that destination address is currently associated with a plurality of registered User Equipments, UEs. The AS then determines whether or not a UE associated with the destination address, is already involved in a session. If so, the AS causes the session initiation request to be forwarded only to that UE. If not, the AS causes the session initiation request to be forwarded to all UEs registered in respect of the address.

18 Claims, 8 Drawing Sheets

SESSION INITIATION HANDLING

This application is a 371 of International Application No. PCT/SE2013/051582, filed Dec. 20, 2013, the disclosure of which is fully incorporated herein by reference.

TECHNICAL FIELD

The present invention relates to the handling of session initiation requests in a telecommunications network. In particular, the invention relates to the handling of a request in the case where a subscriber has multiple user equipments.

BACKGROUND

As mobile telecommunications networks are used more and more in everyday life, many users now have multiple user equipments, UEs. For example, a user may have a tablet, a personal mobile phone, a business mobile phone, etc. In order to simplify the experience for such a user, IP Multimedia Subsystem, IMS, networks provide functionality for having a single SIP address for a user be directed to multiple UEs (e.g. a user may have a single telephone number which is associated with multiple UEs). When an INVITE request is sent to the SIP address of the user, the network will fork the INVITE request to each of the UEs associated with the address. The session will be established with whichever of the UEs accepts the INVITE request first by responding with a 200 OK.

Similarly, many UEs are now capable of handling multiple simultaneous sessions, using features such as call waiting, ad-hoc conference calls, or split-screen video calling. However, if a user already has a session in progress on one of their UEs, the IMS will still offer all incoming session requests to all UEs registered for the user. As such, the call may be accepted by a UE other than that involved in the first session, which prevents the UE involved in the first session from making use of the simultaneous session handling features. Furthermore, the user may struggle to use both UEs involved with sessions at once, or the second session may not be answered by the user (e.g. in the case where a user has left one of their UEs at home, and someone in the household hears the UE ringing and answers it on their behalf).

SUMMARY

According to a first aspect of the present invention, there is provided a method of handling SIP session initiation requests in an IP Multimedia Subsystem, IMS, network. The method is performed at an application server, AS, within the network. The AS receives a session initiation request containing a destination address, where that destination address is currently associated with a plurality of registered User Equipments, UEs. The AS then determines whether or not a UE associated with the destination address, is already involved in a session. If so, the AS causes the session initiation request to be forwarded only to that UE. If not, the AS causes the session initiation request to be forwarded to all UEs registered in respect of the address.

According to a second aspect of the present invention, there is provided an apparatus configured to operate as an application server in an IP Multimedia Subsystem, IMS, network. The apparatus comprises a first transceiver, a second transceiver, and a request handling unit. The first transceiver is configured to receive a SIP session initiation request containing a destination address, where that destination address is currently associated with a plurality of registered User Equipments, UEs. The second transceiver is configured to forward SIP requests. The request handling unit is configured to determine whether or not a User Equipment, UE, associated with the destination address is already involved in a session, and, if so, to cause the session initiation request to be forwarded only to that UE via the second transceiver and, if not, to cause the session initiation request to be forwarded to all UEs registered in respect of the address via the second transceiver.

According to a third aspect of the present invention, there is provided an apparatus configured to operate as a User Equipment, UE, in an IP multimedia subsystem, IMS, network. The apparatus comprises a session initiation handler and a transceiver. The session initiation handler is configured to include a media feature tag comprising an identifier for the UE in ACK or 200 OK response messages sent by the UE during session establishment. The transceiver is configured to send the ACK or 200 OK response messages towards an application server.

According to a fourth aspect of the present invention, there is provided a computer program comprising computer readable code which, when run on an apparatus, causes it to behave as an apparatus according to any of the above aspects.

DETAILED DESCRIPTION

Problems associated with routing session initiation requests to multiple user equipments (UEs) associated with a given subscriber have been identified above. A solution to these problems is proposed herein. This solution insures that, in the event that a user with multiple user equipments (UEs) is already involved in a session (e.g. a voice or video call) on one of their UEs, future session initiation requests are only directed to that UE. Example implementations are described below, but in each case session setup signalling for a subscriber is directed via an application server in the subscriber's home network.

Figure 1:
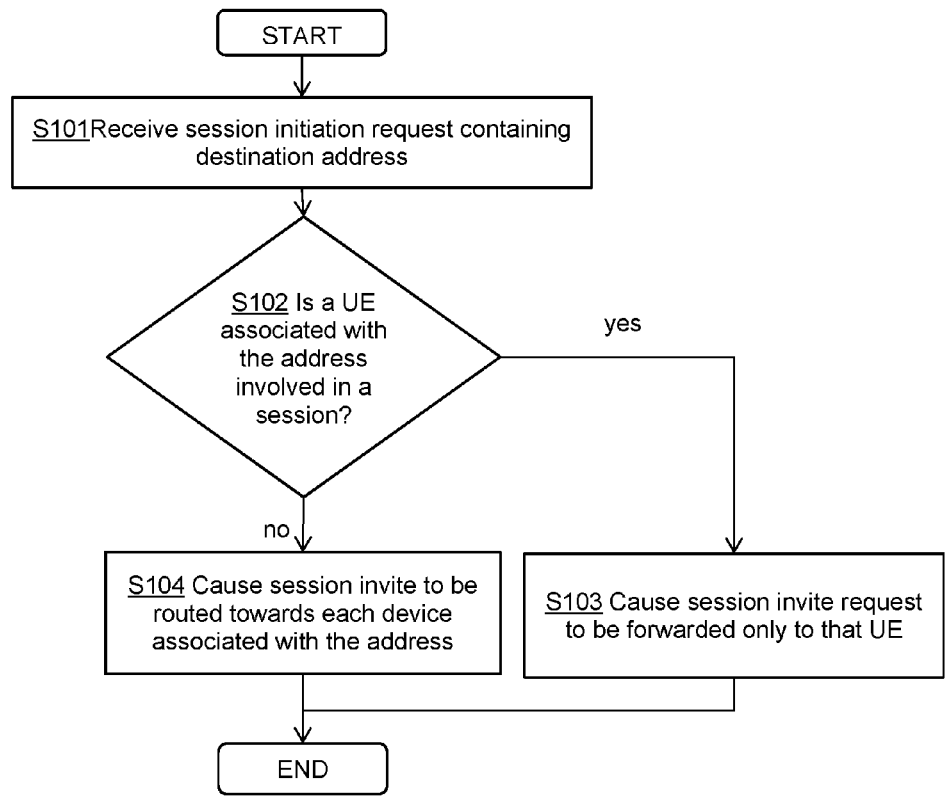
FIG. 1 is a flowchart showing a method according to a first embodiment.

The method performed by the application server is show in FIG. 1. The application server keeps a record of ongoing sessions, including the address of the subscriber, and which of the subscriber's devices is used for the call (not shown). When the application server receives a session initiation request (e.g. a SIP INVITE) S101, it checks to see if the destination address for the session initiation request is associated with an ongoing session S102. If there is no ongoing session, the session initiation request is forwarded as normal S104. If there is an ongoing session, the application server determines which UE associated with the destination address is involved in the session, and causes the session initiation request to be forwarded to that UE in preference to other UEs associated with the destination address S103. This preferential forwarding may be achieved by modifying the header information of the session initiation request, e.g. the destination address field, or in the case of a SIP INVITE, the Accept Contact header field (described in more detail below).

Figure 2:
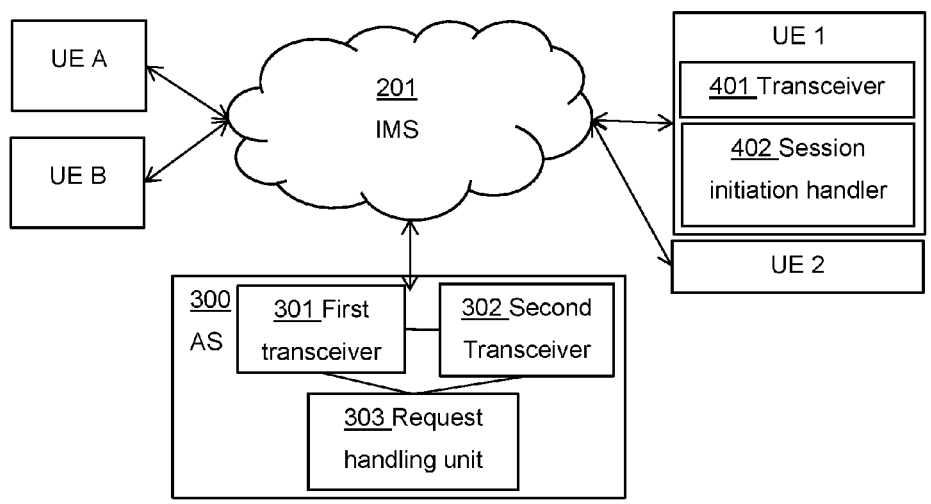
FIG. 2 is a schematic diagram of a telecommunications network.

An example network to illustrate the proposed methods presented below is shown in FIG. 2. For the purpose of describing these methods, the session initiation requests will be take to originate from remote UEs A and B respectively, and the subscriber will be taken to have two registered UEs, a tablet UE 1 registered on both a WiFi and 3GPP Long Term Evolution, LTE, connection, and a mobile telephone UE 2 registered only on an LTE connection. Other than the application server, AS 300, implementing the present solution, the nodes of the IMS are all included under the heading of "IMS" 201, since there is no significant change to their normal operation other than forwarding session initiation signalling to the AS, which can be achieved by techniques well known in the art.

The AS comprises a first transceiver 301, a second transceiver 302, and a request handling unit 303. The first transceiver 301 is configured to receive a SIP session initiation request containing a destination address, where that destination address is currently associated with a plurality of registered User Equipments, UEs. The second transceiver 302 is configured to forward SIP requests. The request handling unit 303 is configured to determine whether or not a User Equipment, UE, associated with the destination address is already involved in a session, and if so, cause the session initiation request to be forwarded only to that UE via the second transceiver. If the UE is not involved in a session, the request handling unit 303 is configured to cause the session initiation request to be forwarded to all UEs registered in respect of the address via the second transceiver.

At least UE 1 and UE 2 comprise (as illustrated for UE 1) a session initiation handler 402 and a transceiver 401. The session initiation handler 402 is configured to include an identifier for the UE in ACK or 200 OK response messages sent by the UE during session establishment. The transceiver is configured to send the ACK or 200 OK response messages towards an application server.

Method 1: Media Feature Tag

In a first proposed method, each of the UEs registers a unique identifier as a supported media feature tag. A new tag may be created for this, e.g. "g.3gpp.next-call-on-same-device=[ID]", where [ID] is the unique identifier. Advantages of using a new feature tag include that the network knows the UE is capable of handling more than one call simultaneously if it includes the tag in messages to the IMS, and the tag can be excluded from SIP messages sent by a UE if the UE is not capable of taking on further calls. The unique identifier may be specific to a UE, or to a UE and access type combination.

Alternatively, the sip.instance media feature tag may be used, which provides a unique identifier for the UE. In order to direct the call to a specific access type, the g.3gpp.accesstype media feature tag may be used. In the below description, the term "new media feature tag" may be replaced by the sip.instance (and optionally g.3gpp.accesstype) media feature tag(s) without changing the method.

In order to inform the AS when the UE has accepted a session, the UE includes the new media feature tag (or at least the unique identifier) in the 200 OK message sent when the session is accepted. Upon receiving the 200 OK message, the AS stores the subscriber address for the UE, and the unique identifier from the new media feature tag. In the case of an outgoing session, the UE may include the new media feature tag in the INVITE or ACK message Upon receiving an INVITE request directed to a subscriber address associated with an ongoing session, the AS modifies the Accept Contact header field of the INVITE request to include the new media feature tag for the UE which is involved in the session. This ensures that the INVITE request is preferentially forwarded to the UE involved in the session.

In order to ensure that the INVITE request is not forked to the user's other UEs, the request may specify tags as defined in the applicable standards, e.g. "no-fork", which will cause the IMS to route the call to only a single device, or the Accept Contact header information may be marked "require" and "explicit". Using both "require" and "explicit" will cause the IMS core network to route the call only to devices having SIP registered the same feature tag/s as included in the Accept-Contact header, choosing from all the users devices, regardless of q-value.

Figure 3:
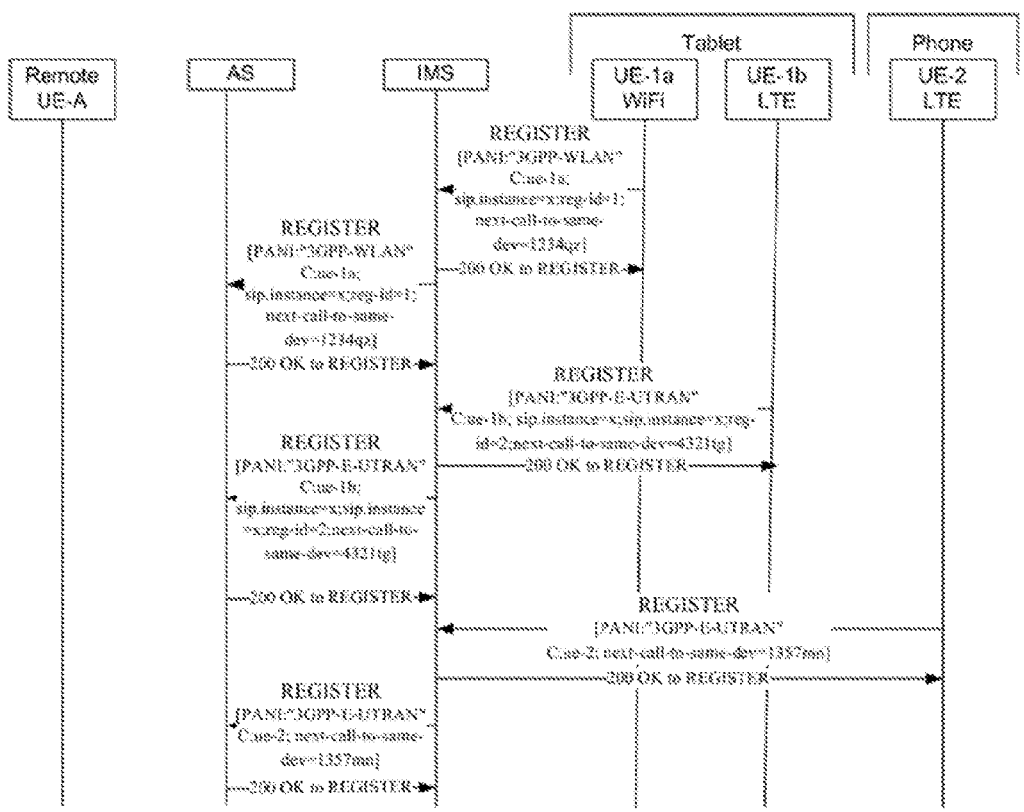
FIG. 3 is a signalling diagram for registration according to a second embodiment.
Figure 4:
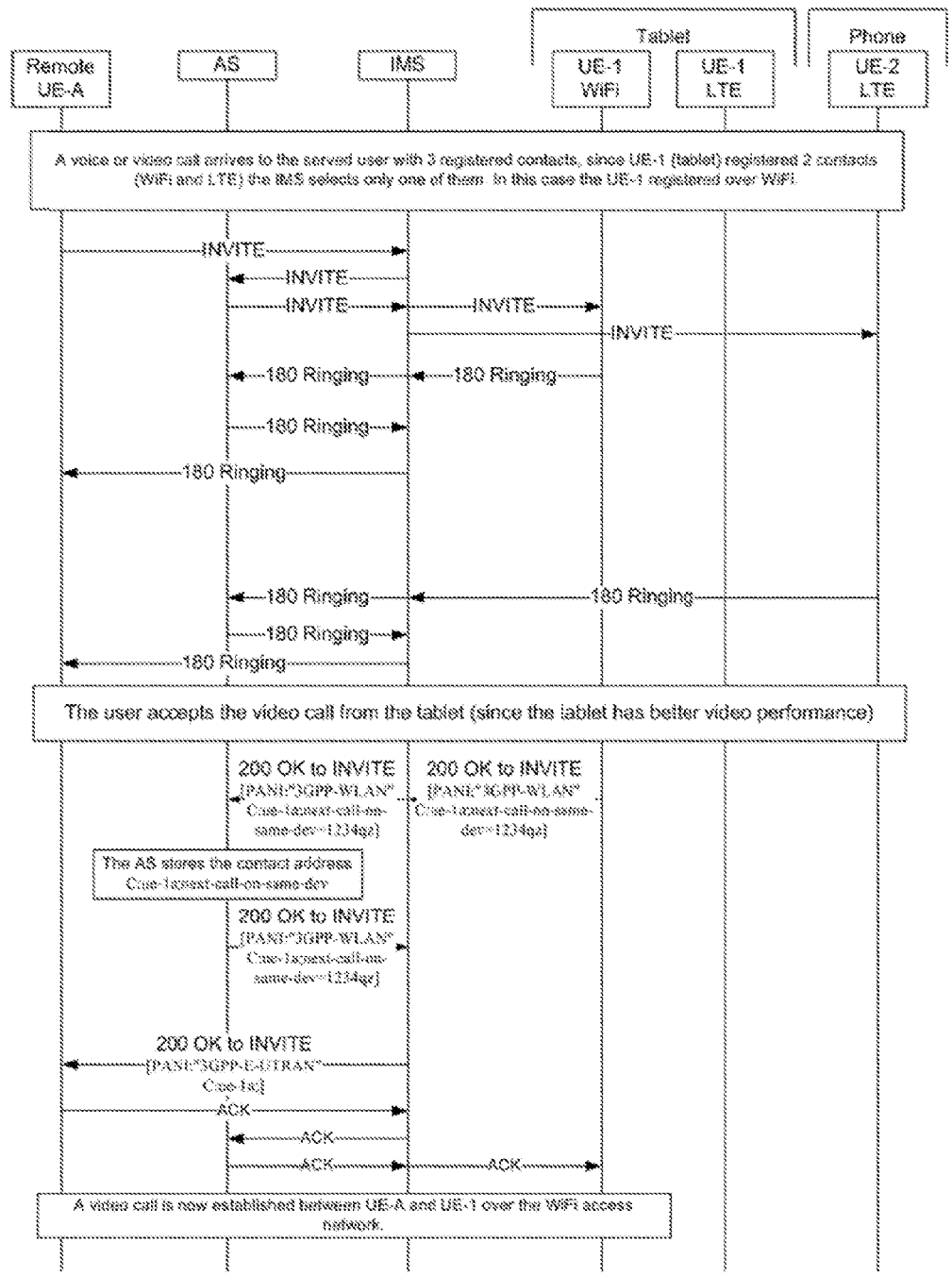
FIG. 4 is a signalling diagram for a session initiation according to a second embodiment.
Figure 5:
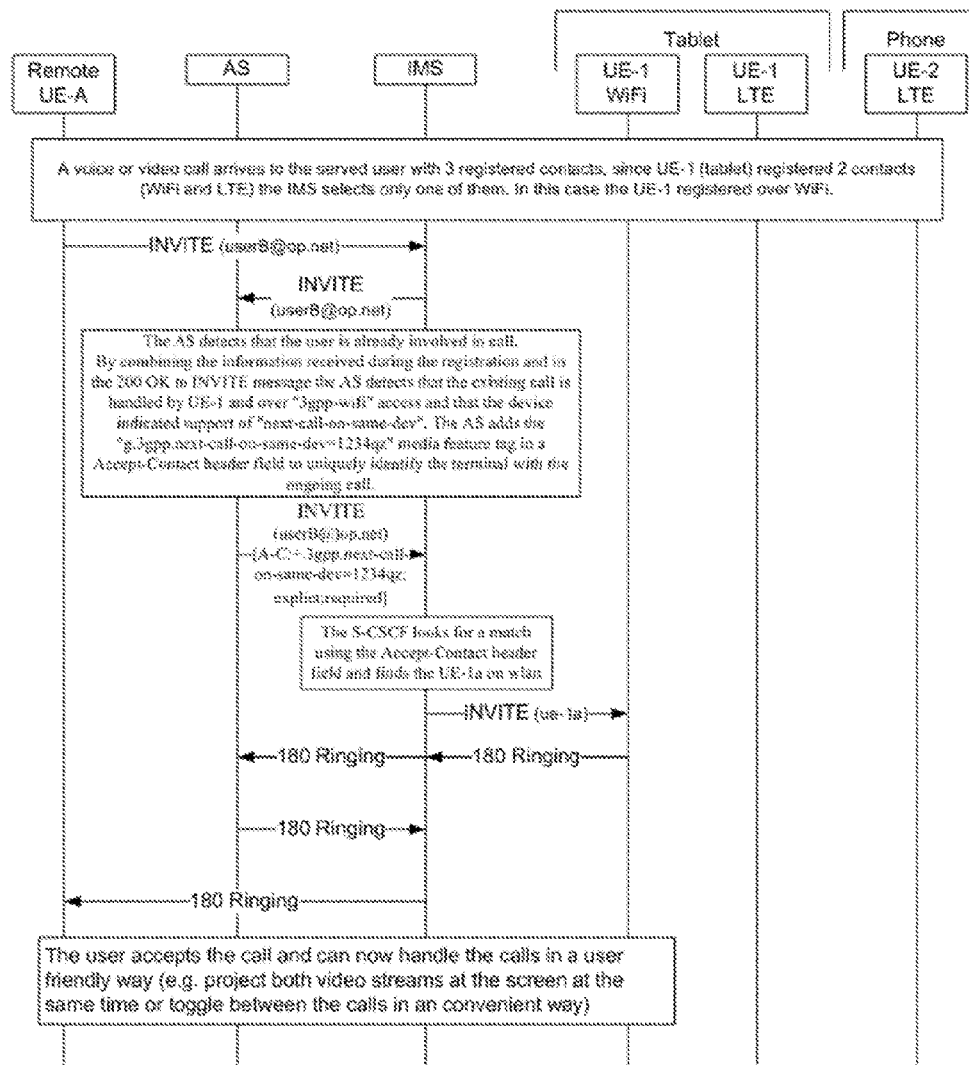
FIG. 5 is a signalling diagram for a further session initiation according to a second embodiment.

Example signalling for the first proposed method is shown in FIGS. 3, 4 and 5. FIG. 3 shows modifications to the registration procedure, FIG. 4 shows the signalling for a first session initiation request directed towards a subscriber address, and FIG. 5 shows the signalling for a subsequent session initiation request directed towards a subscriber address.

When the subscriber's UEs UE-1 and UE-2 register with the IMS, they include in the registration a unique identifier for the UE (and optionally, for the connection type) as a supported media feature tag. In the example of FIG. 3, the tablet registers next-call-to-same-dev=1234qz for the WiFi access type, and next-call-to-same-dev4321tg for the LTE access type. The mobile telephone registers next-call-to-same-dev=1357mn for the LTE access type. The SIP REGISTER is processed in the IMS as defined in current standards so that it can interpret the media feature tags and direct incoming session initiation requests accordingly, and is optionally forwarded to the AS to provide a record of the media feature tags associated with each contact address. If the SIP REGISTER is not forwarded to the AS, then it can still obtain the media feature tags during session initiation for the first call to a device.

FIG. 4 shows the signalling involved in session initiation for a first session according to this method. The initial stages of session initiation proceed as defined in the relevant standards, except that all messages sent to or from the subscriber's UEs UE-1 and UE-2 are diverted via the AS. When the user accepts the call from one of the UEs (in this case, the tablet, UE-1), the UE includes the new media feature tag in the 200 OK response. The AS receives the 200 OK response, and stores the subscriber address of the UE, and the media feature tag in a list of ongoing sessions. The 200 OK response is then forwarded towards the remote UE-A, optionally with the media feature tag removed by the AS or another IMS node. In the case of an outgoing session initiation from one of the subscriber's UEs, the method is analogous, except that the media feature tag is included in the final ACK message.

FIG. 5 shows the signalling involved in session initiation for a second session initiated while the first session is ongoing. The SIP INVITE request addressed to the subscriber is received at the IMS and forwarded to the AS. The AS determines that the subscriber is already involved in a session, and looks up the media feature tag associated with the UE handling the session. The AS then inserts the media feature tag into the Accept Contact header information of the INVITE request, optionally marking the Accept Contact header information "require" and "explicit" as described above. The modified INVITE request is forwarded towards the user's contact address. When the INVITE reaches an S-CSCF, the S-CSCF determines which of the subscribers connections matches the Accept Contact header information. In this case, because the new media feature tag is unique to the WiFi connection on the tablet, the INVITE request will be directed only towards the tablet, and the user is free to accept the session and/or use features such as call waiting or conference calling.

Figure 6:
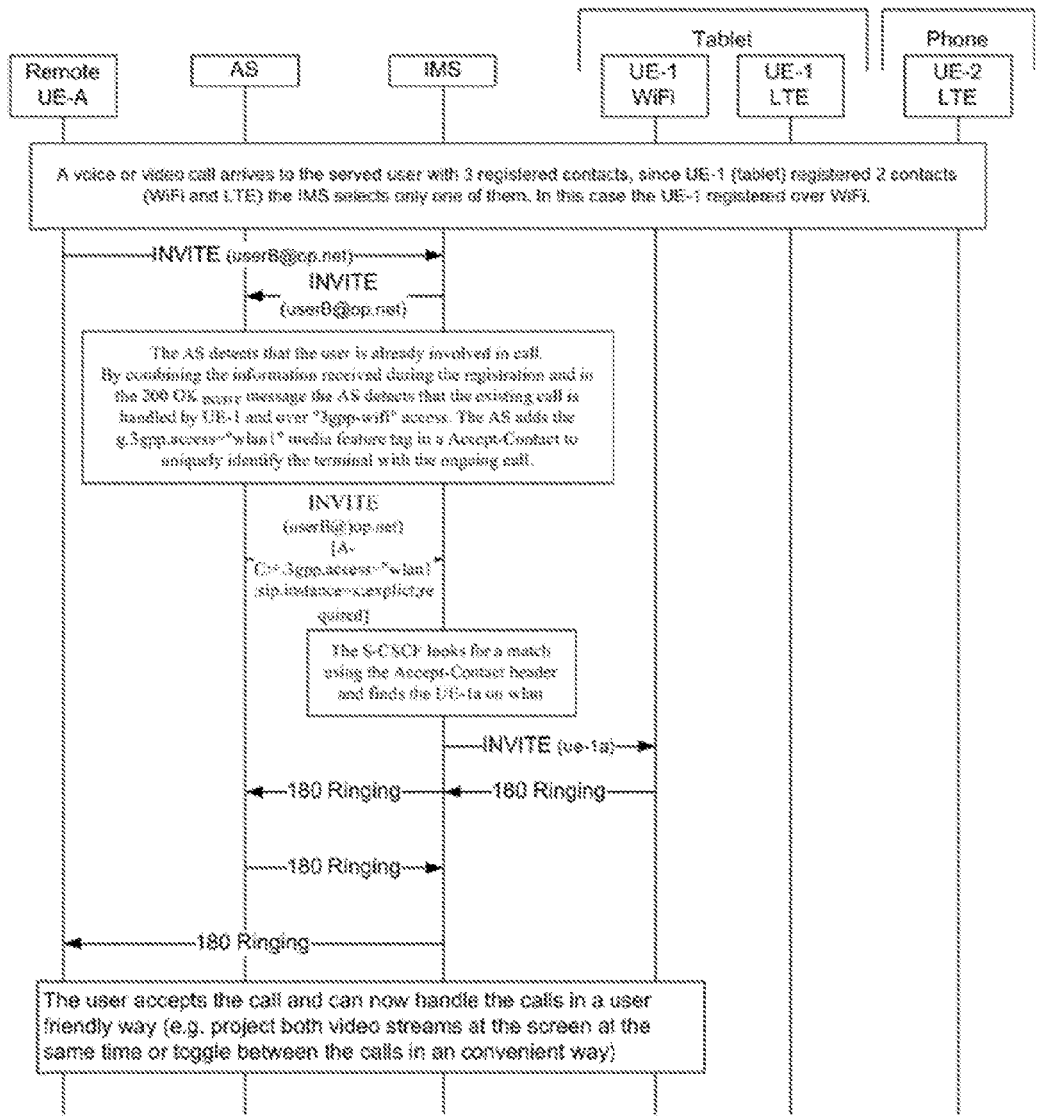
FIG. 6 is a signalling diagram for a session initiation according to a third embodiment.

FIG. 6 shows the signalling involved for initiating the second session in the case where the sip.instance tag is used. The method is the same as the method using the new media feature tag, except that the sip.instance tag is used in place of the g.3gpp. next-call-to-same-dev tag, and if the access type is to be identified, the g.3gpp.accesstype tag must be used.

Method 2: GRUU

A second proposed method is based on the use of the Globally Routable User-agent URI, GRUU, for each of the subscriber's UEs. A GRUU is a SIP URI which identifies a specific user agent (i.e. a specific end-point such as a UE), rather than a subscriber. Using the GRUU as the destination address for a message causes that message to only be sent to the specific UE associated with the GRUU.

Figure 7:
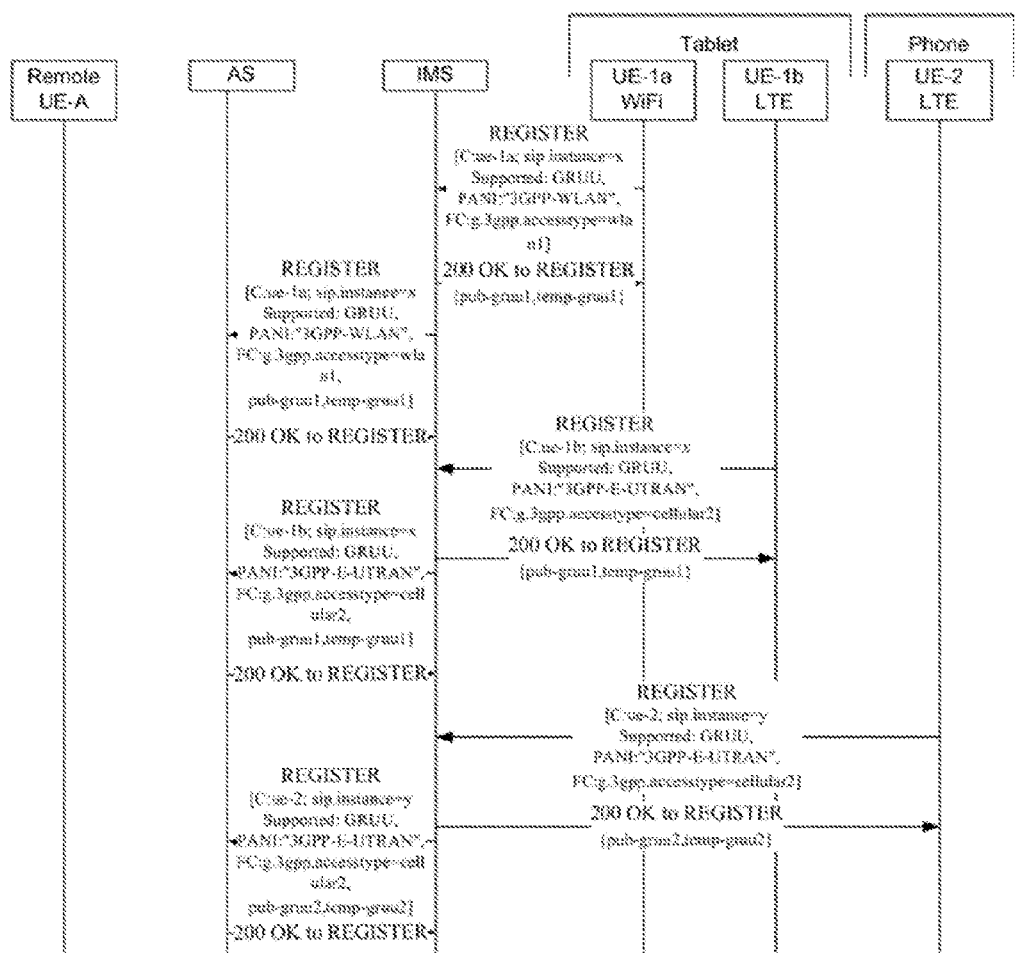
FIG. 7 is a signalling diagram for registration according to a fourth embodiment.
Figure 8:
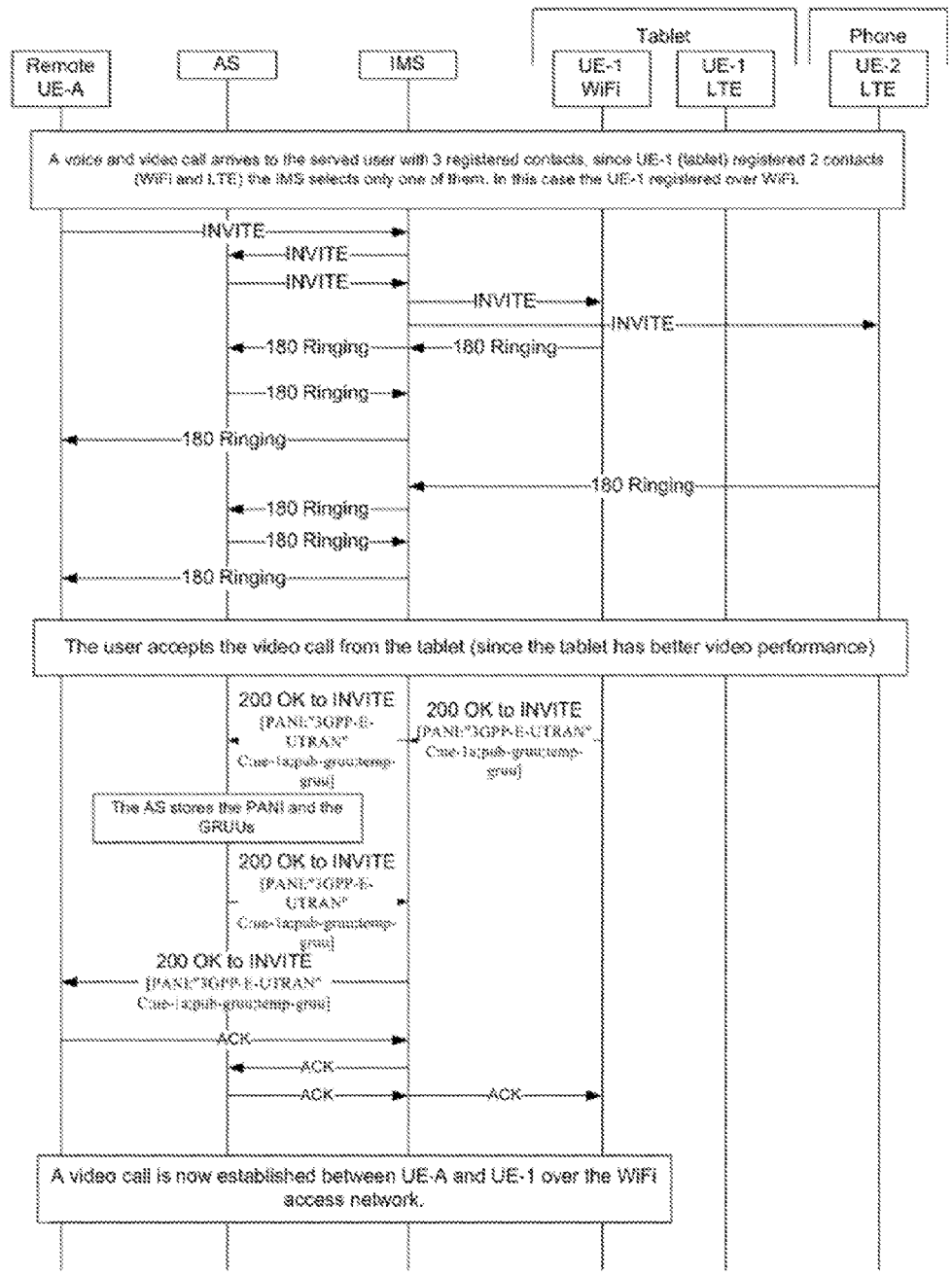
FIG. 8 is a signalling diagram for a session initiation according to a fourth embodiment.
Figure 9:
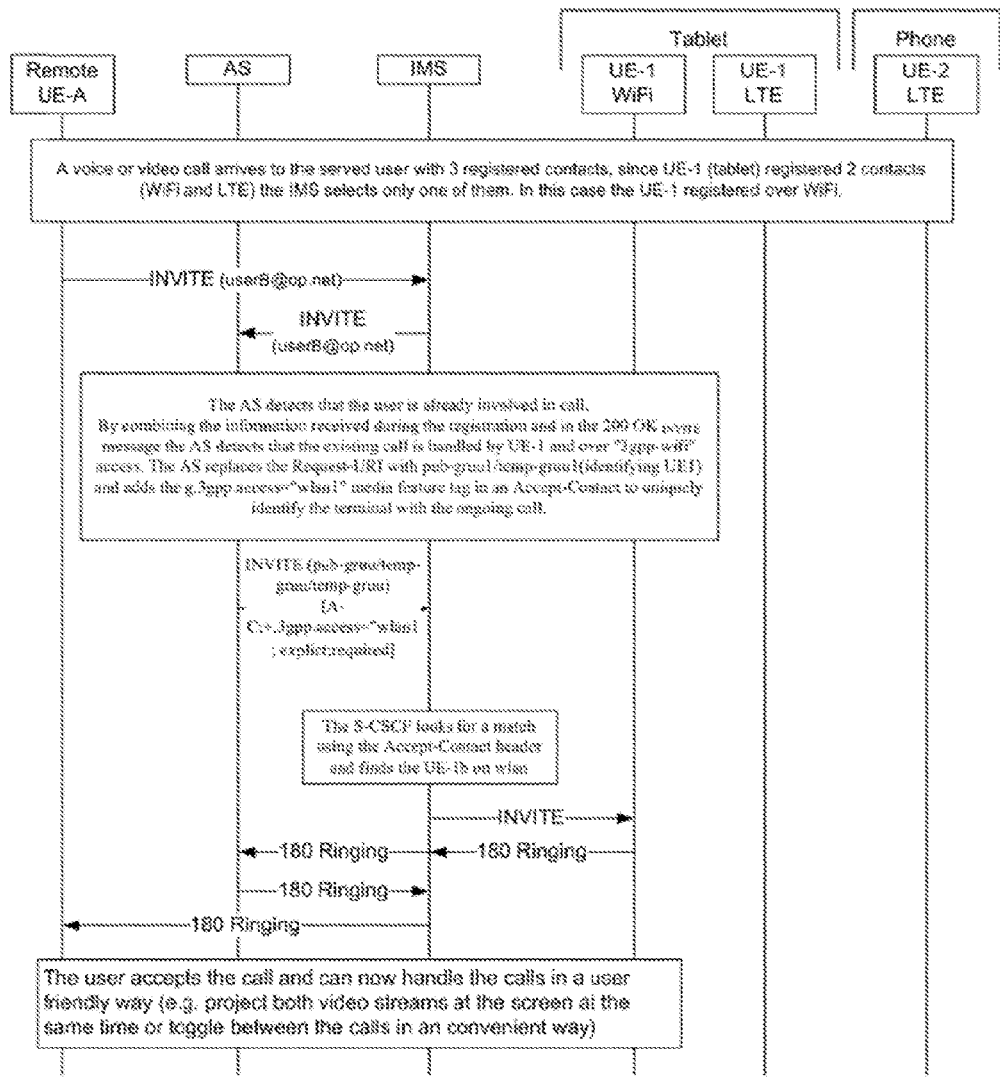
FIG. 9 is a signalling diagram for a further session initiation according to a fourth embodiment.

Example signalling for the second method is shown in FIGS. 7, 8 and 9. FIG. 7 shows modifications to the registration procedure, FIG. 8 shows the signalling for a first session initiation request directed towards a subscriber address, and FIG. 9 shows the signalling for a subsequent session initiation request directed towards a subscriber address.

During registration, as shown in FIG. 7, the IMS assigns GRUU values to each device. According to the present method, the IMS may also inform the AS of these GRUU values for storage. As in method 1, if the AS does not obtain the GRUU values at this time, they may instead be obtained during session initiation for a first session involving the UE. The AS may also be informed of the access types registered for each GRUU.

FIG. 8 shows the signalling involved in a first session initiation request directed towards the subscriber. The initial stages of session initiation proceed as defined in the relevant standards, except that all messages sent to or from the subscriber's UEs UE-1 and UE-2 are diverted via the AS. When the user accepts the call from one of the UEs (in this case, the tablet, UE-1), the UE includes its GRUU in the 200 OK response, and optionally also the access type used to accept the call. The 200 OK response is routed via the AS, which stores the subscriber address and the GRUU (and optionally the access type) in a list of ongoing sessions. The 200 OK is then forwarded towards the remote UE which initiated the session initiation, and the session initiation proceeds as normal.

FIG. 9 shows the signalling involved in session initiation for a second session initiated while the first session is ongoing. The SIP INVITE request addressed to the subscriber is received at the IMS and forwarded to the AS. The AS determines that the subscriber is already involved in a session, and looks up the GRUU (and optionally the access type) associated with the subscriber. The AS then modifies the destination field of the INVITE header so that the INVITE is directed towards the GRUU rather than the subscriber address. Optionally, the AS also includes the access type in the Accept Contact header field, and may include "require" and "explicit" tags. The INVITE is then directed to the UE involved in the ongoing session (in this case, the tablet UE-1), and not to the other UEs associated with the subscriber and the user is free to accept the session and/or use features such as call waiting or conference calling.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of handling SIP session initiation requests in an IP Multimedia Subsystem, IMS, network, the method comprising, at an application server within the network:
   receiving a session initiation request containing a destination address, where that destination address is currently associated with a plurality of registered User Equipments, UEs, registered in the same Serving Call Session Control Function, S-CSCF, in the same network, under the same destination address;
   determining whether or not a User Equipment, UE, associated with the destination address, is already involved in a session by looking up the address in a database of addresses associated with UEs handling ongoing sessions; and
   if so, then causing the session initiation request to be forwarded only to that UE, and
   if not, then causing the session initiation request to be forwarded to all UEs registered in respect of the address.

2. The method according to claim 1 and comprising, during establishment of a first session in respect of a given address, recording an identity of a UE handling the session in the database.

3. The method according to claim 2, and comprising, prior to recording the identity of the UE handling the session:
   receiving a OK response associated with the first session; and
   determining the identity of the UE handling the first session from the OK response.

4. The method according to claim 1, wherein the step of causing the session initiation request to be forwarded only to that UE comprises modifying the session initiation request.

5. The method according to claim 4, wherein the session initiation request is an INVITE request, and modifying the session initiation request comprises modifying header information of the INVITE request.

6. The method according to claim 5, wherein the step of modifying header information comprises inserting one or more media feature tags into the Accept Contact header field of the INVITE request, the one or more media feature tags indicating the UE.

7. The method according to claim 6, wherein the one or more media feature tags are indicated as "require" and/or "explicit".

8. The method according to claim 5, wherein the step of modifying header information comprises modifying a destination address of the session initiation request.

9. An apparatus configured to operate as an application server in an IP Multimedia Subsystem, IMS, network, the apparatus comprising:
- a first transceiver configured to receive a SIP session initiation request containing a destination address, where that destination address is currently associated with a plurality of registered User Equipments, UEs, registered in the same Serving Call Session Control Function, S-CSCF, in the same network, under the same destination address;
- a second transceiver configured to forward SIP requests;
- a database configured to store addresses associated with UEs handling ongoing sessions;
- request-handling processing circuitry configured to determine whether or not a User Equipment, UE, associated with the destination address is already involved in a session by looking up the address in the database of ongoing sessions; and
    - if so, cause the session initiation request to be forwarded only to that UE via the second transceiver, and
    - if not, cause the session initiation request to be forwarded to all UEs registered in respect of the address via the second transceiver.

10. The apparatus according to claim 9, wherein the database is further configured to, during establishment of a first session in respect of a given address, record an identity of a UE handling the session in the database.

11. The apparatus according to claim 10, and comprising a third transceiver for receiving a OK message associated with the first session;
wherein the database is further configured to determine the identity of the UE handling the first session from the OK request.

12. The apparatus according to claim 9, wherein the request-handling processing circuitry is configured to cause the session initiation request to be forwarded only to that UE by modifying the session initiation request.

13. The apparatus according to claim 12, wherein the session initiation request is an INVITE request, and the request-handling processing circuitry is configured to modify the session initiation request by modifying header information of the INVITE request.

14. The apparatus according to claim 13, wherein the request-handling processing circuitry is configured to modify the header information by inserting one or more media feature tags into the Accept Contact header field of the INVITE request, the one or more media feature tags indicating the UE.

15. The apparatus according to claim 14, wherein the one or more media feature tags are indicated as "require" and/or "explicit".

16. The apparatus according to claim 9 wherein:
- the first transceiver is further configured to receive a session establishment notification identifying a UE involved in the session; and
- the request-handling processing circuitry is further configured to record that the identified UE is involved in a session.

17. An apparatus configured to operate as a User Equipment, UE, in an IP multimedia subsystem, IMS, network, the apparatus comprising:
- session initiation processing circuitry configured to include a media feature tag in ACK or OK response messages sent by the UE during session establishment, the media feature tag comprising:
    - a unique identifier for the UE; and
    - an indication that the UE is capable of handling more than one call simultaneously; and
- a transceiver configured to send the ACK or OK response messages towards an application server.

18. The apparatus according to claim 17, wherein the media feature tag is of the form g.3pp.next-call-on-same-device=[ID], where [ID] is the unique identifier for the UE.

* * * * *